United States Patent
Farawila (10) Patent No.: US 10,176,897 B2
(45) Date of Patent: Jan. 8, 2019

(54) FLOATING FILTER SCREEN IN A LOWER TIE PLATE BOX OF A NUCLEAR FUEL ASSEMBLY

(71) Applicant: Yousef M. Farawila, Richland, WA (US)

(72) Inventor: Yousef M. Farawila, Richland, WA (US)

( * ) Notice: Subject to any disclaimer, the term of this patent is extended or adjusted under 35 U.S.C. 154(b) by 933 days.

(21) Appl. No.: 14/562,636

(22) Filed: Dec. 5, 2014

(65) Prior Publication Data

US 2016/0358674 A1 Dec. 8, 2016

Related U.S. Application Data

(60) Provisional application No. 61/926,903, filed on Jan. 13, 2014.

(51) Int. Cl.
*G21C 3/322* (2006.01)
*G21C 3/33* (2006.01)
*G21C 3/32* (2006.01)

(52) U.S. Cl.
CPC ........... *G21C 3/322* (2013.01); *G21C 3/3305* (2013.01); *G21C 3/3206* (2013.01); *Y02E 30/31* (2013.01); *Y02E 30/38* (2013.01)

(58) Field of Classification Search
CPC .... G21C 3/322; G21C 3/3206; G21C 3/3305; G21C 9/00
USPC .......................... 376/313, 352, 373, 377, 443
See application file for complete search history.

(56) References Cited

U.S. PATENT DOCUMENTS

| | | | | |
|---|---|---|---|---|
| 5,030,412 A | * | 7/1991 | Yates | G21C 3/3206 376/313 |
| 5,282,231 A | * | 1/1994 | Adams | G21C 3/3206 376/313 |
| 5,361,287 A | * | 11/1994 | Williamson | G21C 3/3206 376/313 |
| 5,519,745 A | * | 5/1996 | Proebstle | G21C 3/3206 376/313 |
| 2011/0164719 A1 | * | 7/2011 | Aleshin | G21C 3/3305 376/313 |
| 2012/0207262 A1 | * | 8/2012 | Diller | G21C 3/3305 376/313 |

* cited by examiner

*Primary Examiner* — Jack W Keith
*Assistant Examiner* — Daniel Wasil (57) ABSTRACT

A method and device is claimed for preventing reverse coolant flow in a BWR Power Reactor. The device comprises a screen that is free to move between a top plate and a bottom plate in a fuel assembly lower tie plate box. Flow holes are formed and aligned in the top plate and in the bottom plate, creating a path for reactor coolant. Disks at a bottom of the screen are aligned with the flow holes in the bottom plate, and are shaped and formed to cover flow holes in the bottom plate. When flow stagnates or reverses, the screen drops causing the disks to rest on the bottom plate blocking downward flow. Upstanding tabs at the top surface of the screen contact the top plate when normal coolant flow is in the upward direction, allowing flow through the flow holes in the top plate.

4 Claims, 14 Drawing Sheets

FLOATING FILTER SCREEN IN A LOWER TIE PLATE BOX OF A NUCLEAR FUEL ASSEMBLY

PROVISIONAL TO NON-PROVISIONAL

This Non-Provisional Utility Application is from that Provisional Application 61/926,903 filed Jan. 13, 2014 for inventor Yousef Farawila. Early publication is requested per CFR 1.211(a). The filing fee and the fee for early publication are paid by credit card.

FIELD OF THE INVENTION

The present invention relates to boiling water reactors (BWR). More specifically, a new method and device are disclosed for preventing the flow and power oscillations from growing to severely large amplitudes thus protecting the reactor from the consequences of instabilities associated with the so-called anticipated transients without scram (ATWS).

BACKGROUND OF THE INVENTION

Boiling Water Reactors are large machines designed for electric power generation using nuclear fission as a heat source. Power is generated in the reactor core which is placed inside a large pressure vessel. The reactor core is made up of an arrangement of fuel assemblies also called fuel bundles. Typically, there are 400~800 fuel assemblies in a BWR core. Each of the fuel assemblies is arranged inside a vertical channel of square cross section through which water coolant is injected from the bottom. Each of the fuel assemblies consist of a plurality of vertical rods arrayed within the said vertical channels in a typically 7×7, 8×8, 9×9, or 10×10 rod matrix. The said rods are sealed cylindrical tubes inside which ceramic pellets of fissionable material, e.g. Uranium oxide, are stacked. The fuel rod tubes, also called cladding, and the outer channel encasing each fuel assembly, are made of a low neutron absorbing metal such as Zirconium-based alloys. The fuel rods are spaced and supported by an upper a lower tie plates. Mechanical support to maintain the rod positions against possible bow under thermal or mechanical loads is provided by several spacer grids. A handle attached to the upper tie plate is used for transporting the fuel assembly. The lower tie plate is the coolant flow entry point and is designed to fit the core support plate.

The water flows upward in the fuel channels and removes the heat generated in the pellets by the fission of the uranium and plutonium nuclei. In addition to its cooling function, the water serves as neutron moderator. The neutron moderation function is achieved as the neutrons produced in the fission process collide with the hydrogen atoms in the water molecules and slow down to lower energies which increase the probability of inducing further fission reactions.

In Boiling Water Reactors, the water coolant is allowed to boil as it travels up in each fuel assembly channel. The density of the coolant is reduced by the boiling process and consequently the moderating function is adversely affected particularly in the upper part of the fuel assembly where the fuel-to-moderator ratio becomes higher than optimally desired. This problem was mitigated in some fuel assembly designs by introducing one or more water rods or channels, henceforth called water channels. A water channel is a hollow tube or conduit extending vertically along the fuel rods, and through which part of the water flows without boiling. Thus, the amount of water available for the neutron moderating function is increased. The said improvement in the moderation function comes at the expense of reducing the amount of water available for the cooling function. Another common improvement in the design fuel assemblies is the use of part-length fuel rods. While the typical active length of a full-length fuel rod is 3.8 m, few short rods in selected array positions are used. The length of a part-length rod is typically half to two-thirds that of the full length rod, and there are typically 8 to 12 part-length rods in each assembly. The space vacated by cutting down the length of some rods is filled with voided coolant (steam-water mixture) flow, and therefore restores the fuel-to-moderator ratio in the top part of the fuel assembly closer to the optimum value for nuclear criticality. The use of part-length fuel rods is also beneficial in reducing the flow resistance in the top part of the assembly as the flow area is increased. However, the use of part-length rods comes at the expense of the amount of fissionable material that can be packed into a fuel assembly.

The reactor core therefore is made of a number of parallel, nuclear-heated, boiling channels. The core is supported at the bottom with the so-called core support plate, where each of the fuel assembly is seated on a flow opening called inlet orifice. The inlet orifices restrict the flow into each fuel assembly and serve to distribute the total flow into the core evenly among individual fuel assemblies. The core is encased in a cylindrical shroud which separates the upward boiling flow inside the core from the downward flow in the downcomer, where the latter is the annulus space between the core shroud and the pressure vessel wall. The core shroud is capped at the top by a dome-like structure to form the so-called upper plenum. The liquid water and steam mixture flowing from the exit of the core fuel assemblies mix freely in the upper plenum and continue their upward flow into a set of parallel tubes called standpipes emanating from the upper plenum dome. Each standpipe is fitted with a steam separator device which directs almost dry steam into the upper part of the pressure vessel where it flows into the steam lines leaving the pressure vessels in order to drive steam turbines for the purpose of generating electric power. The saturated water leaving the steam separators is directed to flow down into the water pool that surrounds the standpipes and mix with the lower temperature feedwater returning from the condenser. This subcooled water flows downward in the downcomer being driven by a combination of the density head and that of an array of pumps placed in the downcomer. The water leaving the downcomer gather in the so-called lower plenum before it is distributed through the orifices at the bottom of the core, continue to flow upward and boil in the fuel channels, and exit the core thus completing the recirculation loop. In the special case of recirculation pumps not operating or tripped, the coolant flow occurs by natural circulation, that is driven solely due to density difference between the single phase side outside the core, and the two-phase side in the core and the riser assembly which consists of the upper plenum, the standpipes, and steam separators. Natural circulation is an operating state where the flow is reduced and the power-to-flow ratio is higher than the case with the pumps operating, thus prone to density wave instabilities.

The nuclear reaction is controlled by the so-called control rods which are neutron absorbing devices that can be moveable in the spaces between fuel assemblies and are driven by mechanisms under the core support plate thus occupying part of the space of the pressure vessel lower plenum. The control rods can be inserted quickly to shut down the chain reaction in the core, an operation called scram. The scram function is needed for terminating plant transients that have the potential of bringing the operation outside the plant design limits. Reactor scram can be initiated either automatically or by operator action. In some accident scenarios, the scram function is assumed to fail and the consequences of such hypothetical scenarios are used for risk assessment guiding the design and licensing of boiling water reactors.

Detailed description of BWR design and operation can be found in Ref. (1).

A central part of the background of this invention is the coolant flow and core power instabilities which must be avoided for safe and smooth operation of the BWR plant. The instability phenomena and the effects of the resulting power and flow oscillations are described below.

The reactor operation is stable under normal operating conditions, but can depart from stable configuration at conditions of typically high power combined with low flow. The nature of the instability is outlined below.

The unstable behavior in a BWR is associated with the density waves in vertical boiling channels such as BWR fuel assemblies. In the case of a random perturbation to the flow rate at the inlet of the channel, while the energy transfer rate to the coolant remains unchanged, a corresponding enthalpy wave travels upward with the flow.

Downstream from the elevation of boiling inception, the flow enthalpy is translated to a steam quality wave where more steam is generated per unit of flow rate to account for an enthalpy increase. The void fraction (by volume), defined as the ratio of the steam volume to the total volume, is generally proportional to the steam quality, and therefore a void fraction wave traveling up the boiling channel results from the originating inlet flow perturbation. The void fraction can be expressed in terms of the average flow density, where maximum density is associated with zero void content, and minimum density is associated with a void fraction of unity. We can therefore speak of a density wave which results from an originating inlet flow perturbation. All flow parameters, mainly flow rate and steam quality and void fraction, are subsequently perturbed and the perturbations travel upward in the boiling channel with a phase lag.

The density wave alters the flow characteristics in two ways. The first one is that the total weight of the coolant in the channel, which is proportional to the integrated density along the channel, is altered dynamically resulting in a net gravitational pressure head response. The second way is the change in friction pressure drop along the channel. The friction pressure drop in turn is affected in two ways: the first way is through the change in the flow rate itself (friction being proportional to the square of flow rate), and the second way through the change in the so-called two-phase multiplier which accounts for the increase in frictional pressure drop for higher steam quality. In an idealized situation, the net pressure drop across the channel is kept constant, which leaves a residual component of force to compensate for the driving changes in density head and the changes in friction. The net force accelerates the flow, which reinforces an original flow perturbation of the so-called resonant frequency leading to the potential growth of the oscillation. The density wave degree of stability is reduced for higher power-to-flow ratios and for bottom-peaked axial power distribution as they tend to increase the void content and subsequently the density head feedback which drives the instability. High friction pressure drop at the channel inlet increases kinetic energy dissipation and helps to stabilize density waves, while high friction at higher elevations is destabilizing due to the phase lag of their effect which tends to reinforce the original perturbation.

In a BWR, the oscillation of flow rate in the fuel bundles resulting from density waves is complicated by the double role the water plays in the operation of the reactor. The density wave results in a corresponding neutron moderation effectiveness which in turn results in nuclear reactivity and fission power responses. The fission energy generated inside the fuel rods is transferred to the coolant through heat conduction in the fuel rods through the clad surface. The fluctuation of the heat flux through the clad surface is filtered through the heat conduction processes through the fuel rods and the clad surface heat flux experiences a damped and delayed response relative to the fission power itself. The fluctuation of the heat flux results in corresponding fluctuations in the boiling rate and the coolant density where such feedback tends to further destabilize the density waves in the boiling channels.

The operation of BWR under oscillating conditions is not permitted by the Nuclear Regulatory Commission (NRC) in the US or its equivalent authorities in foreign countries. This restriction is placed in order to avoid violating the thermal limits in the fuel, potentially resulting in fuel damage.

A detailed report on density wave instabilities and oscillations in BWR's can be found in Ref. (2).

The prior art dealt with stability issues in various ways. In one way, new fuel designs aim at maintaining the level of stability as the preceding designs or better, but actual improvements could hardly be achieved without negatively impacting other parameters important to the economic performance of fuel designs such as power density. Modern fuel designs tend to include larger number of smaller diameter rods compared with older designs, which are less stable due to decreasing the rod heat conduction time constant. The use of part-length rods tends to stabilize the hydraulic flow by reducing flow resistance in the top part of the channel, but comes at the expense of reducing the mass of the fissionable material load in each fuel bundle. The use of water channels improves stability through reducing the relative dependence on the steam-water mixture coolant for neutron moderation, but it comes at the expense of reduced number of fuel rods. In general, fuel design modifications are not sufficient to achieve unconditional stability. Another way of dealing with BWR stability is limiting the degree of axial and radial power peaking variations anticipated in the design of a reload fuel cycle, which adversely affects the net energy that can be generated by the reactor in any given fueling cycle. The most effective way to deal with the potential for instability in the prior art is the operations option. In one of these operational solutions, the operation of the reactor is restricted inside a pre-calculated so-called exclusion zone, which is an area in the power-flow map characterized by high power-to-flow ratio. The other operational solution is the so-called detect and suppress (D&S) solution, where an automatic shut down is initiated upon detection of oscillatory behavior. In essence, protection of the reactor fuel against the consequences of power and flow instabilities is dependent on the ability to scram before the unstable oscillations grow to a magnitude that is sufficiently large to cause fuel damage.

A central part in defining the need for the present invention is the rare hypothetical event called Anticipated Transient Without Scram (ATWS) which potentially results in large unstable power and flow oscillations. Basically, an anticipated transient such as a turbine trip results in a sequence of control actions and the plant responds as designed by tripping the recirculation pumps bringing the core flow to the lower rate associated with natural circulation. The tripping of the turbine deprives the feed-water heaters from their steam supply and the temperature of the coolant entering the core is reduced. This combination of conditions, relatively high power and low coolant flow rate that enters the core at lower than normal operation temperature, is conducive to instability. The reactor protection system is designed to scram, however the adverse condition of failure to scram that is the so-called ATWS condition may lead to severe power and flow oscillations that have the potential of causing serious fuel damage. Simulations of such ATWS transients can be found in References [3] and [4]. It is shown in Reference [4] that the flow oscillations are so severe that the inlet flow rate in some fuel bundles reverses direction momentarily, that is the flow oscillation magnitude significantly exceeds the average flow rate; and the resulting calculated temperature of the fuel rod surface is sufficiently high to breach the cladding integrity.

The prior art recognizes the problem of unstable power and flow oscillations during ATWS, and mitigation measures are prescribed. As shown in Reference [3], the oscillations are damped and the reactor is successfully shut down upon the injection of boron in the reactor vessel. However, the boron injection cannot be accomplished without delay and severe oscillations can be reached in the meantime. Also, the subsequent cleanup of the reactor vessel to remove the injected boron before operation is resumed is difficult and expensive. The prior art is silent concerning any hardware or fuel design modifications that protect the reactor core from severe power and flow oscillations of an ATWS. The present invention provides this protection as described in the following sections.

The prior art addresses the need for trapping debris that may be carried by the cooling water through the lower tie plate where they come into contact with the fuel rods and could cause fretting of the cladding material and eventually fuel rods leaking. For this purpose, filters are installed in the lower tie plate. The present invention provides a novel means for stopping flow-carried debris, which can be relied on solely or in addition to a filter of a prior art design.

The problems of loss-of-coolant accidents are well known, which are addressed by injecting emergency core cooling water. Improving the efficiency of emergency core cooling is a standing problem in the nuclear technology. However, no hardware modifications could be found in the prior art to address this problem.

BRIEF SUMMARY OF THE INVENTION

In accordance with the present invention, a new method for limiting the growth of flow oscillations in unstable BWR cores is disclosed. The method prescribes limiting the amplitude of the inlet coolant mass flow oscillations in unstable fuel bundles to the average flow rate value thus the inlet mass flow reversal is prevented. This limitation of the flow oscillation magnitude at the inlet of the fuel bundle also limits the severity of the flow conditions at higher elevations where critical heat flux may be exceeded, thus protecting the fuel rods from exceeding their permissible temperature and accomplishing the intended benefit of the invention which is prevention of fuel damage. The method is realized using a device placed in the fuel bundle lower tie plate that allows the inlet mass flow in the forward (upward) direction while introducing high flow resistance in case the flow direction is reversed.

The function of this invention of allowing upward flow while obstructing downward (reverse) flow provides means for allowing faster core reflood using core top spray emergency cooling following a loss of coolant accident. This is accomplished by preventing or substantially reducing the leakage of coolant through the bottom of the core.

This invention provides the needed geometry for preventing debris carried by the coolant flow from entering the bundle and coming into contact with the fuel rods thus preventing debris fretting mode of fuel failure.

DETAILED DESCRIPTION OF THE INVENTION

The basic principle of the present invention to protect the BWR reactor fuel against the consequences of severe coolant flow oscillations that cannot be readily suppressed due to the loss of the scram function rests on recognizing that the fuel rod cladding failure as a consequence of sustained dryout conditions is expected to occur only when the fuel bundle inlet flow oscillation is so severe that substantial flow direction reversal occurs. For smaller flow oscillations the dryout at the fuel cladding surface is reversible and the cladding does not develop temperatures that are sufficiently high to cause its failure. This invention introduces the new method of preventing this type of fuel damage by blocking significant inlet coolant flow direction reversal. The function of the device that realizes this method is to introduce high flow resistance only in the reverse flow direction while the normal flow in the upward direction remains substantially unaffected so that the cooling function under normal operation is fully preserved.

Figure 1:
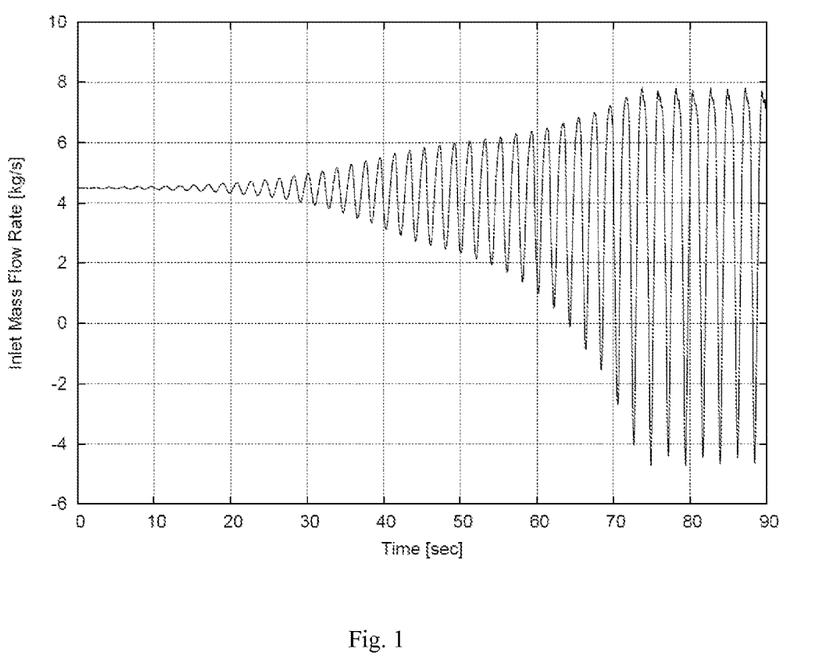
FIG. 1 is a result of a computer simulation of the conditions in an unstable BWR core with fuel bundles representative of the prior art. The figure shows the inlet mass flow rate oscillation with time where the flow oscillation magnitude grows and significant flow reversal occurs.
Figure 2:
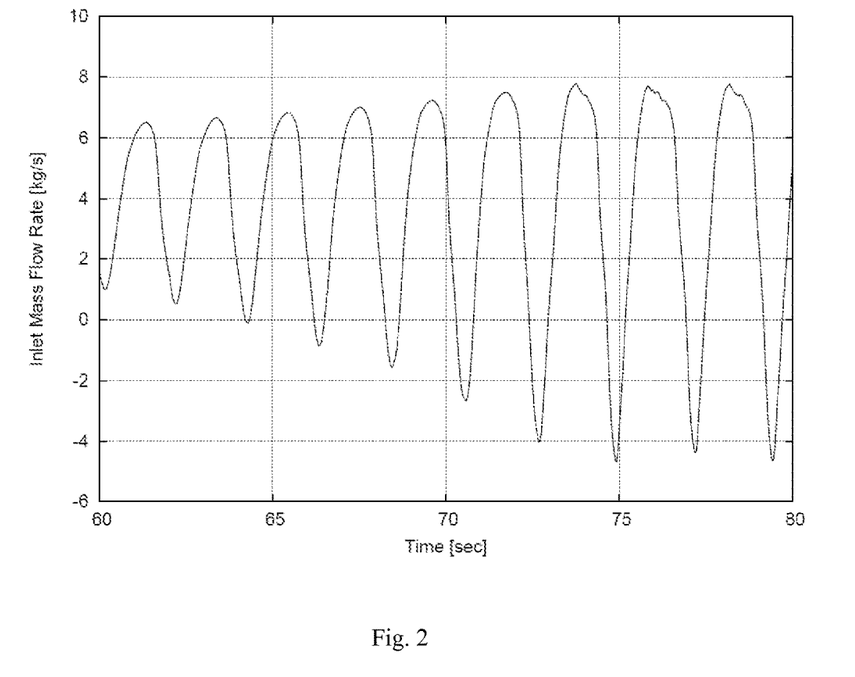
FIG. 2 is a zoom of FIG. 1 where the time interval of 60-80 seconds is shown.
Figure 3:
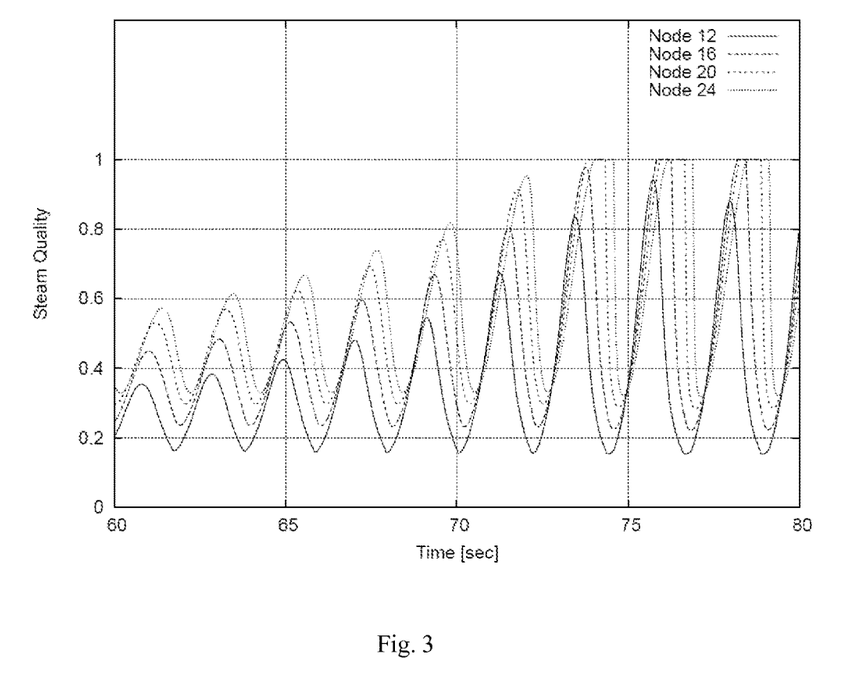
FIG. 3 shows the steam quality oscillation in the upper half of the bundle in the transient and time interval shown in FIG. 2. The bundle is divided into 24 nodes for the purpose of the numerical simulation of the instability. Steam quality at nodes 12, 16, 20 and 24 of a total of 24 computational nodes are shown. The steam quality reaches its upper limit of unity in several of these nodes where the exit node 24 shows the largest steam quality oscillation.
Figure 4:
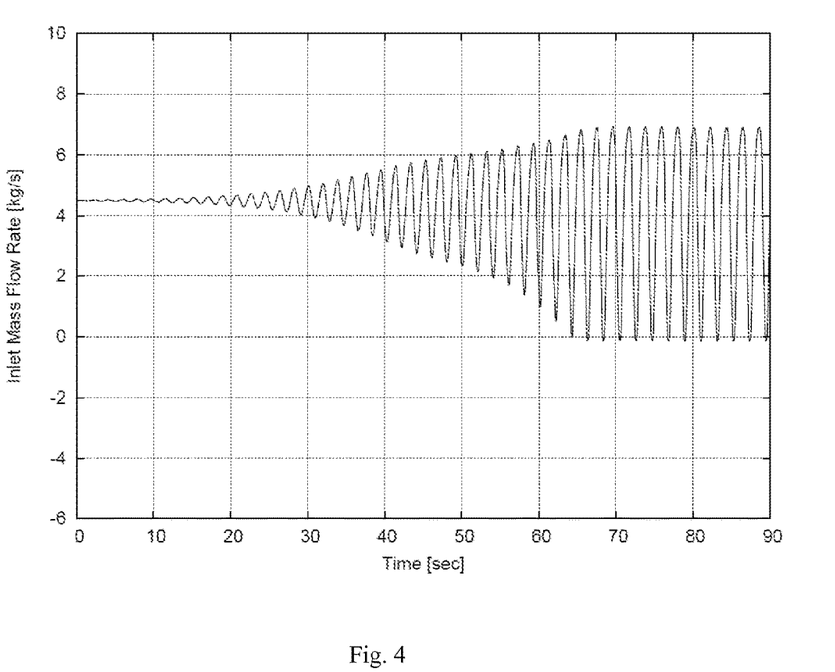
FIG. 4 is a result of a computer simulation of the conditions in an unstable BWR core similar to FIG. 1, with the exception that the fuel bundles are designed in accordance with the current invention to block inlet flow reversal. It is shown that the inlet mass flow oscillation magnitude is limited where very small flow reversal is allowed.
Figure 5:
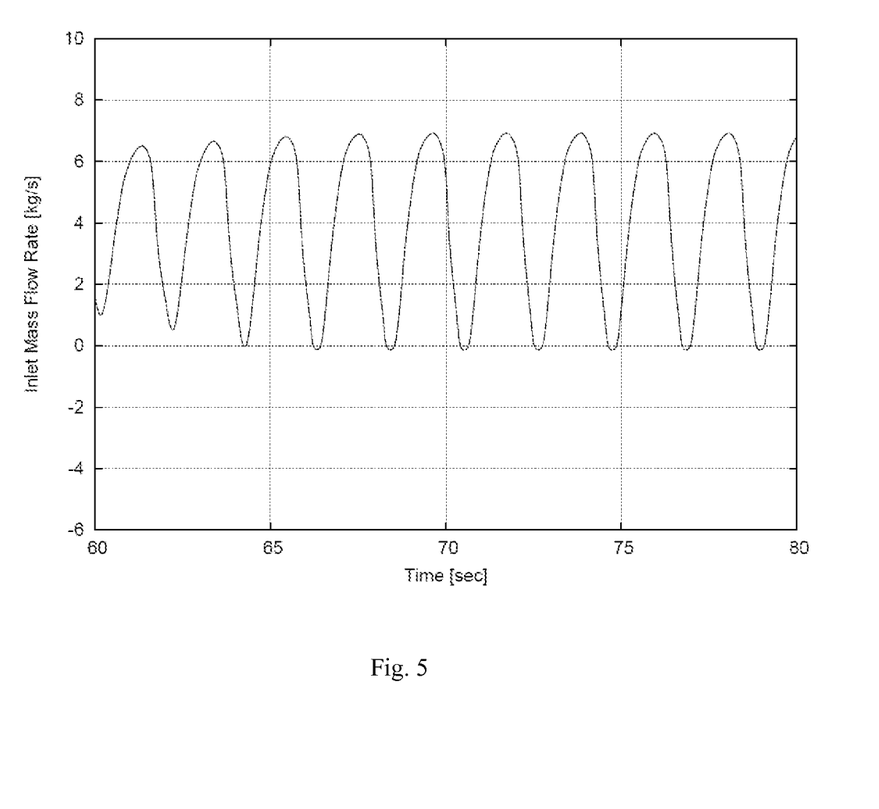
FIG. 5 is a zoom of FIG. 4 where the time interval of 60-80 seconds is shown.
Figure 6:
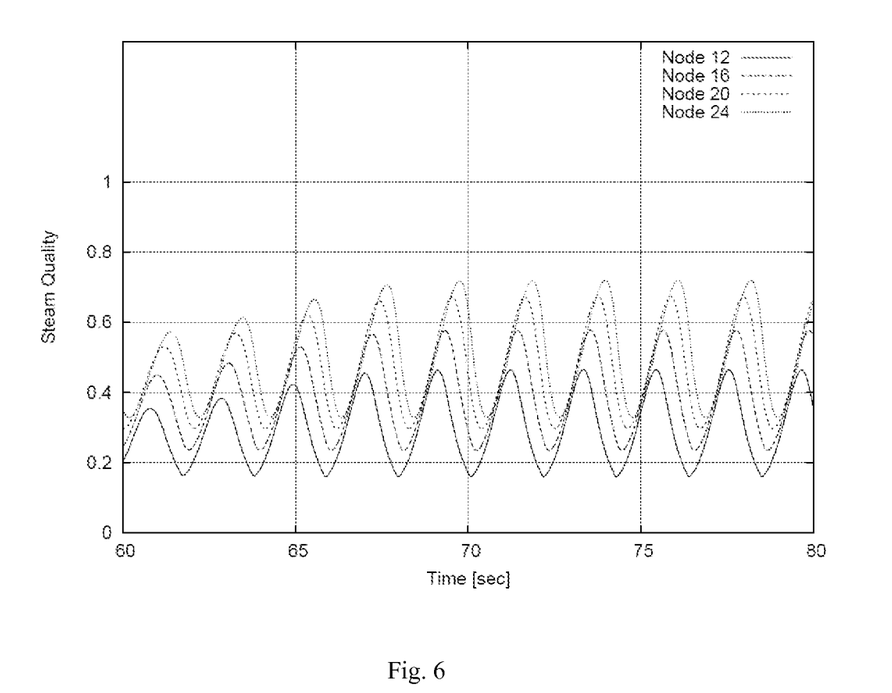
FIG. 6 shows the steam quality oscillation in the upper half of the bundle in the transient and time interval shown in FIG. 5. Steam quality at nodes 12, 16, 20 and 24 of a total of 24 computational nodes are shown. The steam quality is shown to remain well below its upper limit of unity in all the nodes where the exit node 24 shows the largest steam quality oscillation.
Figure 7:
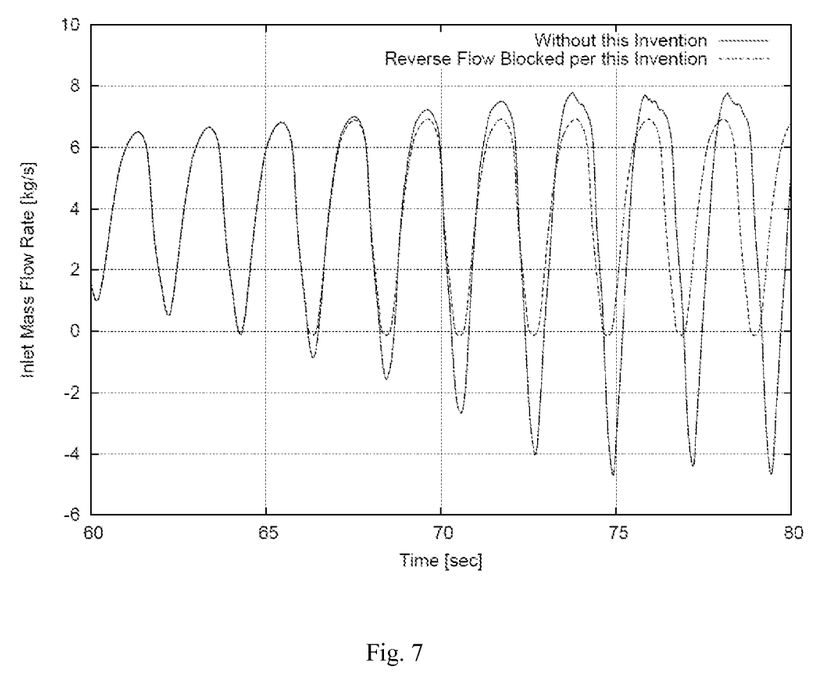
FIG. 7 depicts a comparison between the inlet mass flow rate for the bundle of the prior art and the current invention shown in FIGS. 2 and 5, respectively. It is shown that the oscillation magnitude in the bundle of the prior art (solid line) is high with substantial flow reversal, while the flow in the bundle of the current invention (dashed line) is smaller and reverse flow is very small.
Figure 8:
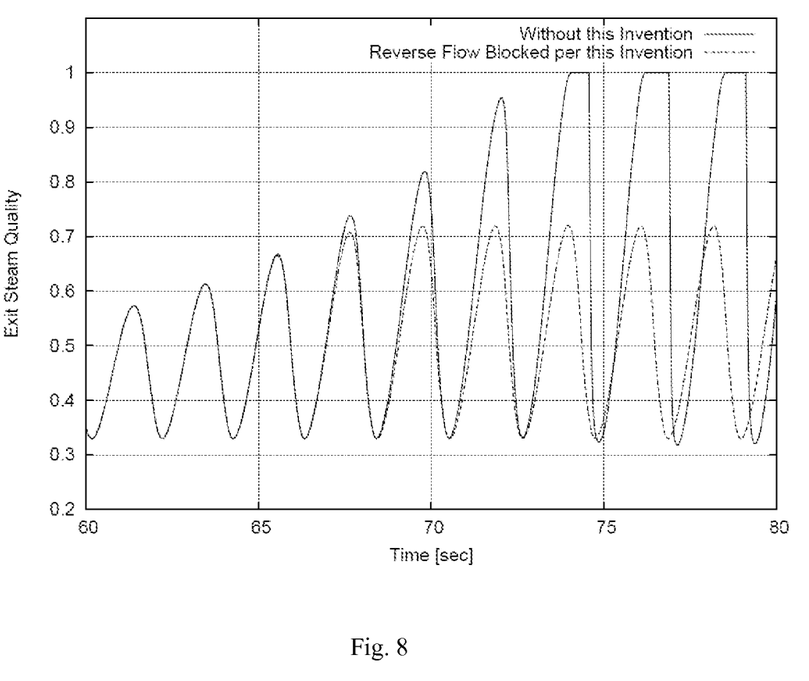
FIG. 8 depicts a comparison between the exit quality oscillations for the bundle of the prior art and the current invention shown in FIGS. 3 and 6, respectively. The calculated exit quality of the prior art is the sold line, and that of the present invention is the dashed line. The figure shows a substantial reduction of the maximum steam quality due to the use of the current invention.
Figure 9:
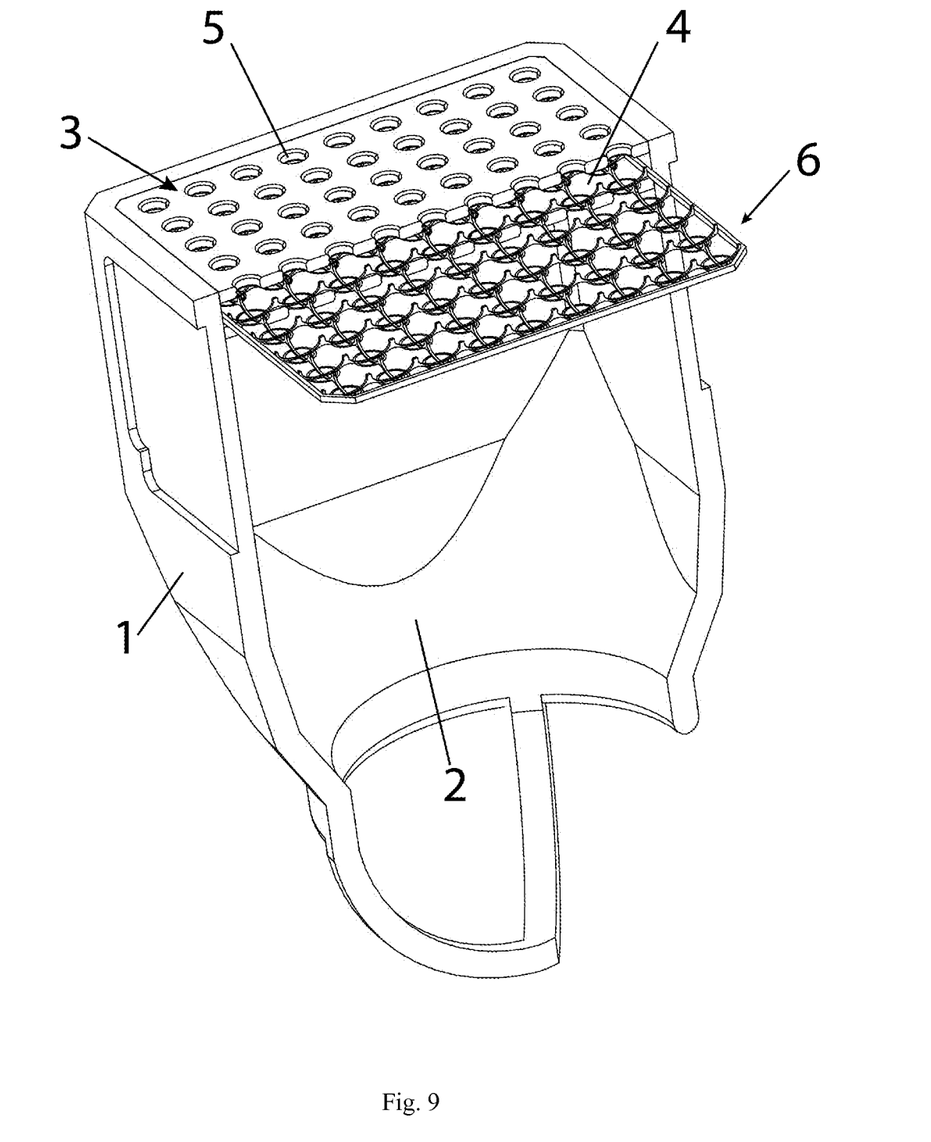
FIG. 9 shows an isometric cut drawing of the lower tie plate component including the structure of the preferred embodiment of this invention. The drawing shows the lower tie plate box (1), the inlet opening (2), an upper plate (3), bottom plate (4) parallel to the plate (3). The to plate (3) and the bottom plate (4) have flow holes (5). The space between the top plate (3) and the bottom plate (4) forms a cavity inside which a screen (6) is free to move and rest against the upper plate (3) when lifted up by the normal coolant flow in the upward direction or rests against the bottom plate (4) upon flow reversal or stagnation.

A preferred embodiment of the device that performs the function of this invention of substantially resisting the flow reversal at the inlet of a BWR fuel bundle is described here. FIG. 9 shows an isometric cut drawing of the lower tie plate component of a fuel assembly including the structure of the preferred embodiment of this invention. The drawing shows the lower tie plate box (1), the inlet opening (2) which is a circular nozzle at the bottom end and is geometrically shaped into wider square cross section that ends on the top with a fuel rod supporting structure. The fuel rod supporting structure is a plate with holes (3). Under the plate (3), another plate (4) parallel to the plate (3) has flow holes that are parallel to the holes (5) in the plate (3). The space between the plates (3) and (4) forms a cavity inside which a screen module (6) is free to move and rest against the upper plate (3) when lifted up by the normal coolant flow in the upward direction or rests against the plate (4) upon flow reversal or stagnation.

Figure 10:
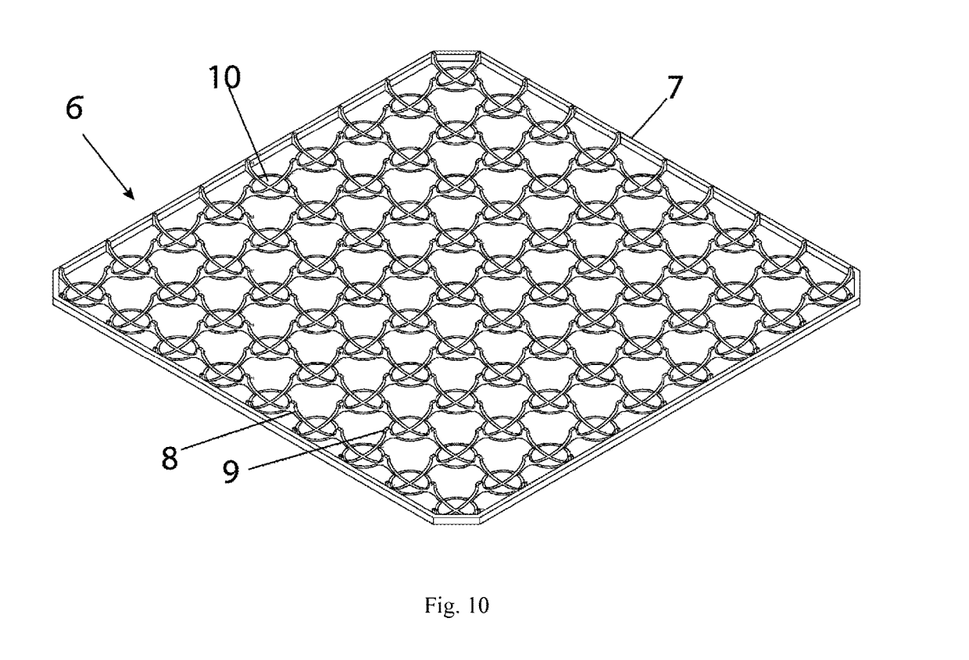
FIG. 10 shows an isometric sketch of the screen shown in FIG. 9 as item (6). Details of the screen structure is shown in FIG. 11.

FIG. 10 shows an isometric sketch of the screen shown in FIG. 9 as item (6). Details of the screen structure is shown in FIG. 11.

Figure 11:
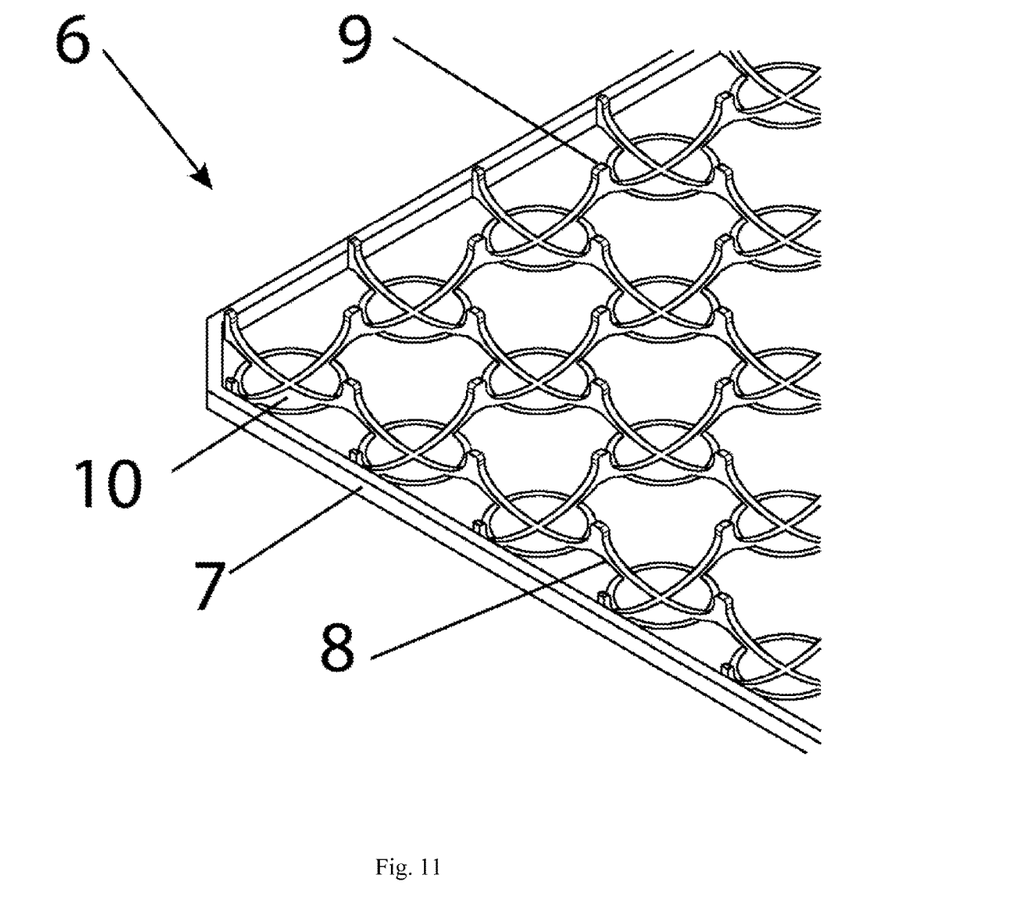
FIG. 11 shows a zoom of FIG. 10. A frame (7) supports a grid structure composed of elements (8). At regular intervals along each grid element (8), tabs (9) serve to limit the range of motion of the screen inside the space between the plates (3) and (4) of FIG. 9. At the crossing of the grid elements, concave disks (10) are attached.

FIG. 11 shows a zoom of FIG. 10. A screen module frame (7) supports a grid structure composed of elements (8). At regular intervals along each grid element (8), tabs (9) serve to limit the range of motion of the screen inside the space between the plates (3) and (4) of FIG. 9. At the crossing of the grid elements, concave disks (10) are attached.

Figure 12:
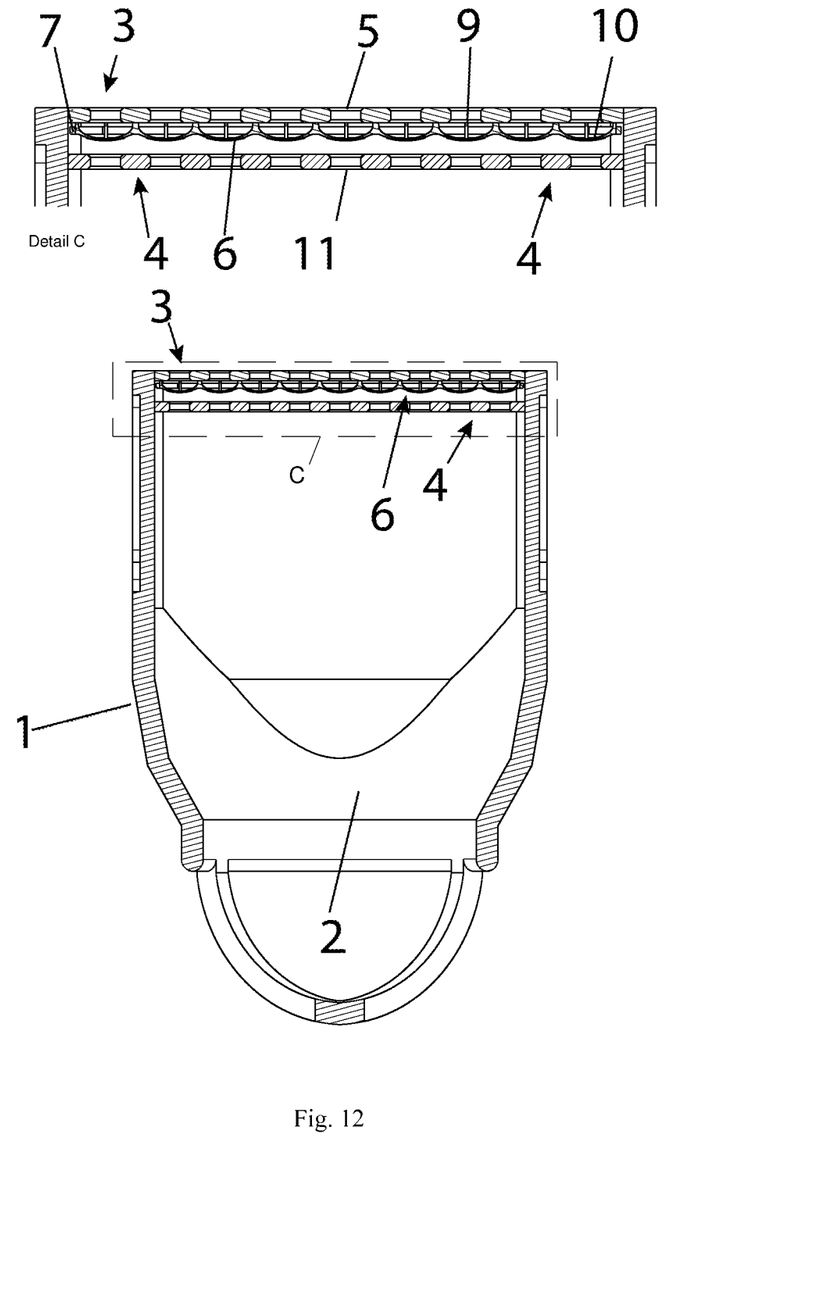
FIG. 12 is a vertical cut drawing of the lower tie plate structure including the floating screen between two holed plates identified as detail (C). The screen is shown in the up position which is the normal position when flow in the upward direction lifts the screen. The up and down positions are detailed in FIGS. 13 and 14 respectively.

FIG. 12 is a vertical cut drawing of the lower tie plate structure including the floating screen between two holed plates identified as detail (C). The screen is shown in the up position which is the normal position when flow in the upward direction lifts the screen. The up and down positions are detailed in FIGS. 13 and 14 respectively.

Figure 13:
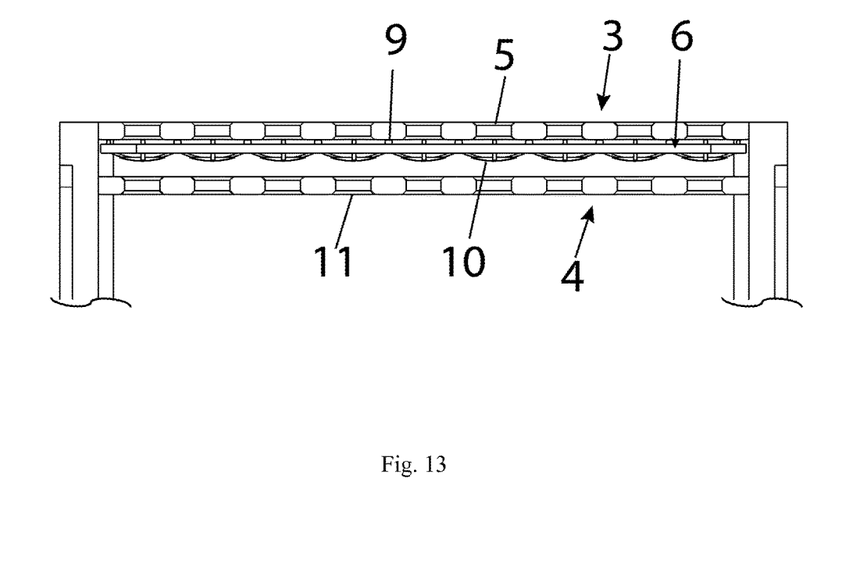
FIG. 13 shows the screen (6) in the space between the plates (3) and (4). The screen (6) is in the up position as it is lifted by the upward flow. The screen in the up position leaves the holes in the plate (4) unobstructed. The holes in the upper plate (4) are also not obstructed by the screen in the up position as the screen is stopped by the tabs (9) against the body of the plate (3).

FIG. 13 shows the screen (6) in the space between the plates (3) and (4). The screen (6) is in the up position as it is lifted by the upward flow. The screen in the up position leaves the holes in the plate (4) unobstructed. The holes in the upper plate (4) are also not obstructed by the screen in the up position as the screen is stopped by the tabs (9) against the body of the plate (3).

Figure 14:
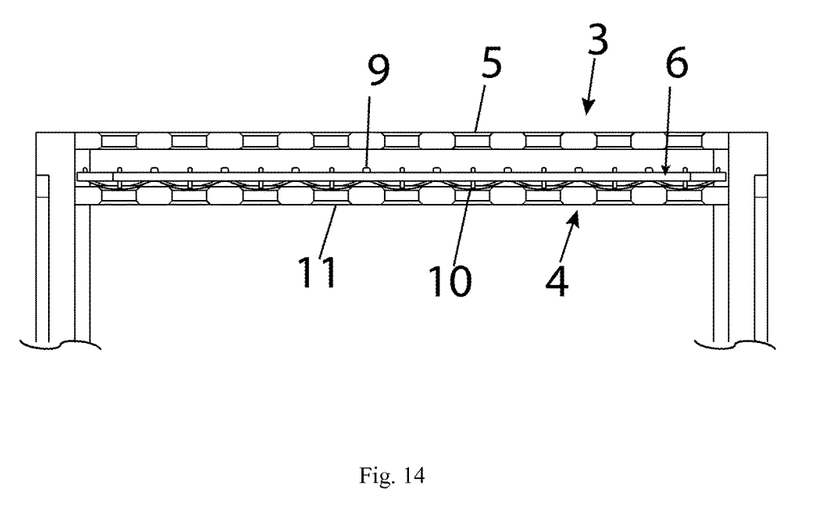
FIG. 14 shows the same structure as in FIG. 13 except that the screen (6) is in the down position in the absence of the upward flow lifting force. In the down position, the concave discs (10) rest on the flow holes of the plate (4) thus obstructing the flow in the downward (reverse) direction.

FIG. 14 shows the same structure as in FIG. 13 except that the screen (6) is in the down position in the absence of the upward flow lifting force. In the down position, the concave discs (10) rest on the flow holes of the plate (4) thus obstructing the flow in the downward (reverse) direction.

When the reactor is operated in an unstable state, the inlet mass flow of the coolant entering each fuel bundle will start to oscillate about its average value. Flow swings take a sinusoidal shape as function of time where the peaks (points of maximum flow rate) and valleys (points of minimum flow rate) of the oscillation are both positive. As the oscillation magnitude grows, the screen remains in the up position as long as the flow at its minimum remains in the upward direction and exerting the small pressure needed to lift the screen and maintain the flow path through the holes open. When the oscillation magnitude of the inlet flow grows such that the flow is not sufficient to maintain the hydraulic force that lifts the screen, that is approaches flow direction reversal, the screen drops to the down position with the disks blocking the flow holes beneath them. As the flow oscillation magnitude continues, the hydraulic forces bring the flow back in the upward direction which lifts the screen and the flow in the upward direction is allowed unobstructed. The largest flow oscillation magnitude through the inlet of a fuel assembly equipped with the device of this invention is limited as further oscillation growth is prevented by the flow path closure upon the onset of flow reversal. The distance traveled by the screen between the up (open) and down (closed) positions is too small for building up of high speed movement and therefore the opening and closure of the flow path are not abrupt but rather smooth. The performance demonstrating the effectiveness of the method of this invention has been simulated mathematically using a computer code capable of calculating the flow oscillations and unstable density waves in BWR fuel bundles and the associated thermal and hydraulic parameters. The results of such simulation in the absence of the beneficial effects of this invention are shown in FIGS. (1), (2), and (3). FIG. (1) shows the inlet flow oscillation growing to substantial magnitudes where significant flow reversal, i.e. negative flow, occurs. FIG. (2) is a zoom of FIG. (1) in the time interval of 20 seconds in order to show the oscillating inlet mass flow rate more clearly. The resulting steam quality corresponding to these conditions are shown in FIG. (3) demonstrating that the steam quality reaches unity for part of the oscillation cycle which means the fuel rods are totally deprived of the cooling effects of the liquid coolant for a relatively long duration. By contrast, the simulation of the same event is performed with the only difference that the lower tie plate with the device of this invention is used and the results are shown in FIGS. (4), (5) and (6). As shown in FIG. (4), the inlet mass flow rate oscillation continues to grow, similar to FIG. (1), until the flow reversal of small magnitude occurs upon which further growth of the oscillation magnitude is halted. A zoom of FIG. (4) is shown in FIG. (5) in a 20 second interval for better clarity. The corresponding effect on the steam quality is shown in FIG. (6) which is demonstrated to remain well below unity thus guaranteeing the presence of liquid coolant to either prevent dryout or cause rewetting of the fuel cladding surface in case dryout occurs briefly. Thus the fuel cladding temperature remains low and fuel damage is prevented when the current invention is used.

The function of this invention of allowing upward flow while obstructing downward (reverse) flow provides means for allowing faster core reflood using core top spray emergency cooling following a loss of coolant accident. This is accomplished by preventing or substantially reducing the leakage of coolant through the bottom of the core. For emergency core cooling coming into the core through the bottom, this invention would allow it as the flow in this case is in the upward direction.

This invention provides the needed geometry for preventing debris carried by the coolant flow from entering the bundle and coming into contact with the fuel rods.

SUMMARY OF THE DISCLOSURE

A method for preventing boiling water reactor fuel damage due to the growth of unstable density waves by limiting the magnitude of density wave oscillations using a device installed in the inlet structure of some or all of the fuel bundles in the reactor core where such a device prevents the inlet flow to a fuel bundle from reversing direction.

A device to realize the method of claim 1 comprised of a fuel assembly lower tie plate box equipped with a screen module that is free to move between a top plate and a bottom plate; flow holes in the said top plate and said bottom plate are aligned to form a path for coolant flow; the said screen module is lifted by the upward flow hydraulic forces and stopped by tabs against the top plate such that no flow holes are blocked and the flow in the upward direction is unobstructed; the said screen module drops to a low position whenever the flow stagnates or its direction reverses and rests on the lower plate; disks attached to the screen module block the flow holes in the lower plate; in effect the movement of the said screen module between the two parallel top plate and bottom plate allows flow in the upward direction and obstructs flow in the reverse direction.

A method for mitigating the loss-of-coolant accident by preventing or substantially reducing the leakage of water through the bottom of the core thus retaining the emergency core cooling supply introduced as a top spray; in effect reduces the time needed to achieve core reflood and prevents core meltdown.

A device described in [0049] to realize the function of mitigating the loss-of-coolant accident by the method described in claim [0050].

A method for filtering debris that may be carried by the coolant flow entering a BWR fuel bundle and potentially cause fretting fuel rod failures; the said filtering is accomplished by diverting the flow around movable structures inside the lower tie plate of the said bundle.

A device described in paragraph [0049] to realize the debris filtering function described in claim paragraph [0053]

The invention claimed is:

1. A method for preventing growth of unstable density waves in a nuclear power reactor comprising:
    installing a screen that is free to move between a top plate and a bottom plate in a fuel assembly lower tie plate box;
    forming and aligning flow holes, during manufacturing, in the top plate and in the bottom plate creating a path for coolant flow;
    forming disks at a bottom of the screen;
    aligning the disks with the flow holes in the bottom plate;
    shaping and forming, during manufacturing, the disks to cover and prevent flow when the disks cover the flow holes in the bottom plate; and
    the screen dropping when coolant flow stagnates or reverses direction,
        causing the disks to rest on the bottom plate blocking coolant flow in the down direction.

2. The method of claim 1 further comprising:
    forming upstanding tabs at a top surface of the screen;
    lifting the screen by the hydraulic forces of a normal coolant flow in the upward direction acting on the disks; and
    stopping the lifting of the screen by the tabs contacting against the top plate so that no flow holes are blocked in the top plate allowing flow in the upward direction.

3. A device to prevent or substantially minimize reverse coolant flow in a nuclear reactor core comprising:
    a fuel assembly lower tie plate box, having a top plate and a bottom plate, is equipped with a screen that is free to move between the top plate and the bottom plate;
    flow holes in the top plate and the bottom plate are aligned to form a path for coolant flow;
    disks are attached to the screen at a screen bottom
        with the disks aligned with the flow holes in the bottom plate;
    the screen is lifted by an upward flow hydraulic force against the disks; and
    the screen dropping when coolant flow stagnates or reverses direction
        causing the disks to rest on flow holes in the bottom plate blocking coolant flow in the down direction.

4. The apparatus of claim 3 further comprising:
    the screen has upstanding tabs extending upwardly from the screen at a screen top;
    lifting of the screen is stopped by the upstanding tabs contacting against the top plate such that
        no flow holes are blocked in the top plate and
        allowing flow in the upward direction; and
    the disks are sized to cover the flow holes in the bottom plate; and
    whenever the flow stagnates or the flow direction reverses the screen drops and
        the disks cover the flow holes in the bottom plate and restrict downward coolant flow.

* * * * *